United States Patent

Tsuchiya et al.

Patent Number: 6,160,783
Date of Patent: Dec. 12, 2000

[54] OPTICAL PICK-UP DEVICE

[75] Inventors: Yoichi Tsuchiya; Yasuyuki Kanou, both of Hashima; Seiji Kajiyama, Ibi-gun; Koichi Tada, Motosu-gun, all of Japan

[73] Assignee: Sanyo Electric Co., Ltd., Osaka, Japan

[21] Appl. No.: 09/125,788
[22] PCT Filed: Jan. 7, 1998
[86] PCT No.: PCT/JP98/00022
  § 371 Date: Aug. 27, 1998
  § 102(e) Date: Aug. 27, 1998
[87] PCT Pub. No.: WO98/48416
  PCT Pub. Date: Oct. 29, 1998

[30] Foreign Application Priority Data

Apr. 24, 1997 [JP] Japan .................................. 9-107421

[51] Int. Cl.[7] ...................................................... G11B 7/00
[52] U.S. Cl. ........................ 369/112; 369/44.24; 369/110; 369/94
[58] Field of Search ............................ 369/109, 110, 369/112, 44.23, 44.24, 94, 118

[56] References Cited

U.S. PATENT DOCUMENTS 5,930,219   7/1999   Kim ......................................... 369/112

FOREIGN PATENT DOCUMENTS

9-161306   6/1997   Japan .
9-161307   6/1997   Japan .

*Primary Examiner*—Nabil Hindi
*Attorney, Agent, or Firm*—Armstrong, Westerman, Hattori, McLeland & Naughton

[57] ABSTRACT

An optical pick-up device includes an optical active element (11) which transmits an introduced laser beam (18) with its polarization direction (17) rotated by 90° in playback of a DVD and also transmits an introduced laser beam (18) without rotating its polarization direction (17) in playback of a CD, and a polarizer (14) which transmits the entirety of a laser beam with its polarization direction rotated in playback of a DVD and also blocks the perimeter of a laser beam with its polarization direction not rotated in playback of a CD to reduce the effective numerical aperture of an objective lens (15). A rubbing direction (28) of an rubbing film (24) of the optical active element (11) that is positioned at the incident side of the laser beam, is adapted to be parallel to the polarization direction (17) of the introduced laser beam (18). Thus, the optical pick-up device can play back DVD as well as CD while reducing laser beam loss.

7 Claims, 6 Drawing Sheets

OPTICAL PICK-UP DEVICE

FIELD OF THE INVENTION

The present invention relates to an optical pick-up device, and more specifically to an optical pick-up device capable of recording on and/or playback of optical disks each having a transparent substrate of a different thickness.

DESCRIPTION OF THE BACKGROUND ART

A type of optical pick-up devices currently provided employs semiconductor laser to read information recorded on optical disks, such as compact disk (CD) and compact disk-read only memory (CD-ROM). This optical pick-up device irradiates a train of pits on a signal recording surface with laser beam while applying focusing servo and tracking servo controls to an objective lens for pick-up to reproduce audio, video and data signals and the like.

In recent years, optical disks of higher density have been developed to record moving pictures for a long period of time. For example, a digital video disk (DVD) standard has been proposed for recording approximately 5 G bytes of information on one side of an optical disk the diameter of which is the same as that of CD-ROM, i.e. 12 cm.

According to this standard, the transparent substrate of the DVD has a thickness of approximately 0.6 mm.

Optical lens for pick-up is designed taking into consideration the thickness of the transparent substrate of the optical disk to be played back and the wavelength of the semiconductor laser used. Thus, an optical disk the transparent substrate of which is not as designed in thickness cannot be played back since a laser beam is not focused on the signal recording surface of the optical disk.

For example, an objective lens designed for a DVD with a transparent substrate of 0.6 mm in thickness cannot focus a laser beam on the signal recording surface of a CD with a transparent substrate of 1.2 mm in thickness so that the CD cannot be played back.

Therefore the present invention contemplates an optical pick-up device capable of employing the optical activity of liquid crystal to record on and/or playback of optical disks each having a transparent substrate of a different thickness and also capable of reducing loss of laser beam due to the liquid crystal.

DISCLOSURE OF THE INVENTION

An optical pick-up device according to the present invention provides recording on and/or playback of a first optical disk having a transparent substrate of a first thickness and a second optical disk having a transparent substrate of a second thickness greater than the first thickness, and includes a laser, rotation means, an objective lens, and a polarizer. The laser produces a laser beam having a predetermined polarization direction. The rotation means rotates the polarization direction of the laser beam by approximately 90° in recording on or playback of the first or second optical disk. The objective lens focuses the laser beam on the signal recording surface of the first or second optical disk. The polarizer blocks the perimeter of the laser beam in recording on or playback of the second optical disk. The rotation means includes a first transparent electrode, a second transparent electrode, a first rubbing film, a second rubbing film, and liquid crystal. The first transparent electrode is located at the incident side of a laser beam. The second transparent electrode is located at the emissive side of the laser beam and opposite to the first transparent electrode. The first rubbing film is formed on an inner surface of the first transparent electrode and has a first rubbing direction approximately parallel or perpendicular to the polarization direction of the laser beam. The second rubbing film is formed on an inner surface of the second transparent electrode and has a second rubbing direction approximately perpendicular to the first rubbing direction. The liquid crystal is interposed between the first and second rubbing films.

With this optical pick-up device, a laser beam having its polarization direction rotated by liquid crystal by approximately 90° can change the effective numerical aperture of the objective lens to allow recording on and/or playback of optical disks each having a transparent substrate of a different thickness, while the rubbing film located at the incident side of a laser beam can have a rubbing direction approximately parallel or perpendicular to the polarization direction of the laser beam to reduce laser beam loss caused by the liquid crystal. Furthermore, the liquid crystal can rotate the polarization direction of the laser beam accurately by 90° to allow the polarizer to optimally block the light and thus improve the recording or playback characteristic of the device.

THE BEST MODE FOR IMPLEMENTING THE INVENTION

An embodiment of the present invention will now be specifically described with reference to the drawings. Identical or corresponding portions in the figures are denoted by identical reference characters and a description of each portion will not be repeated.

Figure 1:
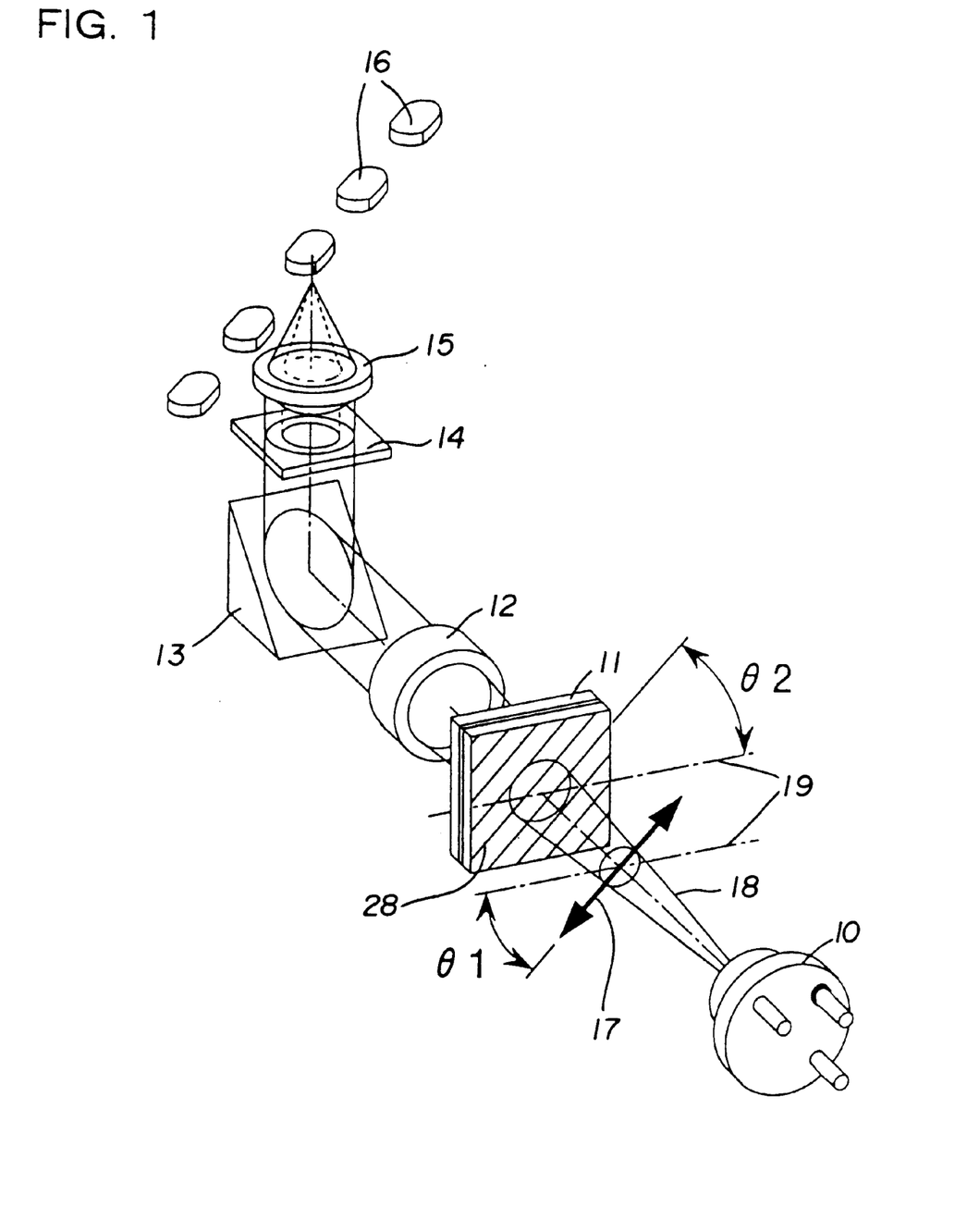
FIG. 1 is a perspective view of an optical system of an optical pick-up device as an embodiment of the present invention.

FIG. 1 is a perspective view of an optical system of an optical pick-up device according to the embodiment of the present invention. The optical pick-up device shown in FIG. 1, including a semiconductor laser 10, an optical active element 11, a collimator lens 12, a mirror 13, a polarizer 14 and an objective lens 15, can play back both DVD and CD. Formed on a signal recording surface of a DVD or CD is a pit 16 which indicates recorded information.

Semiconductor laser 10 produces a laser beam 18 having a predetermined polarization direction 17 which forms a predetermined angle θ1 with respect to a reference 19. The optical pick-up device typically employs a semiconductor laser 10 which produces a laser beam 18 of 635 nm in wavelength to play back a DVD and a CD.

For playback of a DVD, optical active element 11 transmits laser beam 18 with its polarization direction rotated by approximately 90°. For playback of a CD, optical active element 11 does not rotate the polarization direction and thus transmits laser beam 18 as it is.

Collimator lens 12 collimates laser beam 18 from semiconductor laser 10. Mirror 13 reflects the collimated laser beam from collimator lens 12 in the direction of a normal to an optical disk.

Polarizer 14 transmits the entire laser beam for playback of a DVD. Polarizer 14 blocks the perimeter of the laser beam for playback of a CD to transmit only the center thereof.

Objective lens 15, provided for focusing a laser beam on a signal recording surface of a DVD or CD, is arranged opposite to the DVD or CD. Objective lens 15 is designed to minimize aberration in focusing a laser beam on a signal recording surface of a DVD. By means of a servo mechanism (not shown), objective lens 15 is moved in the direction of an optical axis (i.e. the direction of a normal to an optical disk) for focusing control, and is moved in a tracking direction (i.e. a direction perpendicular to a train of pits) for tracking control. It is accordingly desirable that polarizer 14 is fixed integral to object lens 15 so that the center of polarizer 14 is not offset from the optical axis of objective lens 15.

The optical pick-up device also includes a halfmirror (not shown) arranged between semiconductor laser 10 and optical active element 11, and a photodetector (not shown) for detecting a laser beam reflected from the halfmirror.

Figure 2:
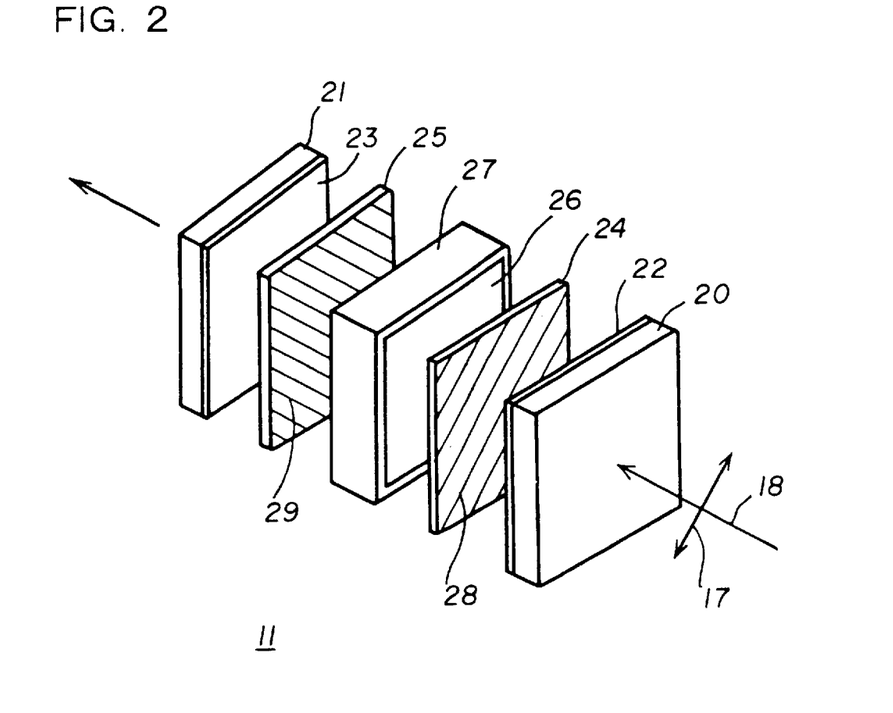
FIG. 2 is an exploded, perspective view of a configuration of the optical active element shown in FIG. 1.

FIG. 2 is an exploded, perspective view of a configuration of optical active element 11 shown in FIG. 1. Optical active element 11 shown in FIG. 2 includes two glass plates 20 and 21 arranged opposite to each other, transparent electrodes 22 and 23 of e.g. ITO formed on the respective inner surfaces of glass plates 20 and 21, rubbing films 24 and 25 formed on the respective inner surfaces of transparent electrodes 22 and 23, liquid crystal 26 of the twisted nematic (TN) type interposed between rubbing films 24 and 25, and a sealing member 27 for sealing liquid crystal 26.

Glass plate 20, transparent electrode 22 and rubbing film 24 are positioned at the incident side of a laser beam. Glass plate 21, transparent electrode 23 and rubbing film 25 are positioned at the emissive side of the laser beam.

Rubbing film 24 positioned at the incident side of a laser beam has a rubbing direction 28 approximately parallel to polarization direction 17 of the introduced laser beam 18, as shown in FIGS. 1 and 2. Thus, an angle θ2 which rubbing direction 28 forms with respect to reference 19 is approximately equal to the angle θ1 described above. In other words, the angle between polarization direction 17 and rubbing direction 28 is adapted to be 0±5°. Rubbing film 25 positioned at the emissive side of the laser beam has a rubbing direction 29 approximately perpendicular to rubbing direction 28 of rubbing film 24 positioned at the incident side of the laser beam. Thus, a series of orientation directions of the molecules of the liquid crystal ranging between rubbing films 24 and 25, is twisted.

Figure 3:
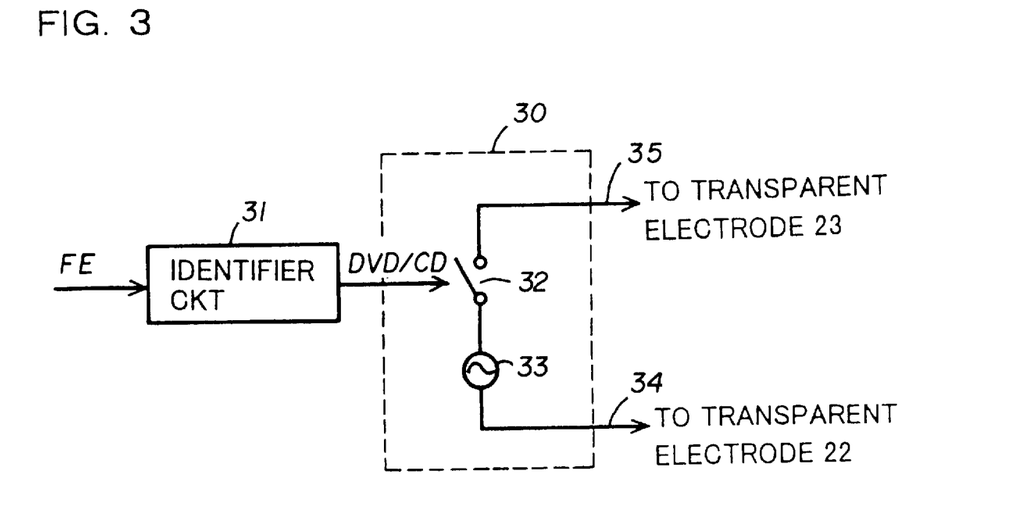
FIG. 3 is a circuit diagram showing a drive circuit for driving the optical active element shown in FIG. 2, together with an identifier circuit.

FIG. 3 is a circuit diagram showing a configuration of a driver circuit 30 for driving the optical active element 11 shown in FIG. 2, together with an identifier circuit. Driver circuit 30 shown in FIG. 3 includes a switching element 32 which is switched on/off in response to an identification signal DVD/CD from identifier circuit 31, and an AC power supply 33 which generates a predetermined alternating voltage. Driver circuit 30 has one output terminal 34 connected to the FIG. 2 transparent electrode 22 and the other output terminal 35 connected to the FIG. 2 transparent electrode 23. Identifier circuit 31 responds to e.g. a known, focus error signal FE to identify an optical disk mounted on the optical pick-up device as a DVD or CD and produce identification signal DVD/CD which indicates the result of identification.

In this embodiment, when a DVD is mounted, switching element 32 is switched off and the alternating voltage is thus not applied between transparent electrodes 22 and 23. When a CD is mounted, switching element 32 is switched on and the alternating voltage is thus applied between transparent electrodes 22 and 23.

Figure 4:
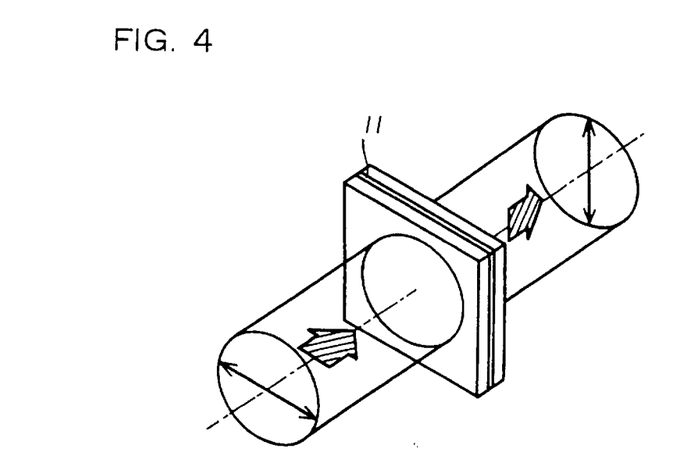
FIG. 4 is a perspective view for illustrating an effect of the optical active element shown in FIG. 2 when no voltage is applied.

FIG. 4 is a perspective view for illustrating an effect of optical active element 11 when voltage is not applied. As shown in FIG. 4, a laser beam incident on optical active element 11 has a polarization direction parallel to the plane of the figure and a laser beam emanating from optical active element 11 has a polarization direction perpendicular to the plane of the figure. Thus, optical active element 11 transmits a laser beam incident when no voltage is applied, with its polarization direction rotated by approximately 90°. By contrast, when voltage is applied, optical active element 11 does not rotate the polarization direction of an introduced laser beam and thus transmits the introduced laser beam as it is.

Figure 5:
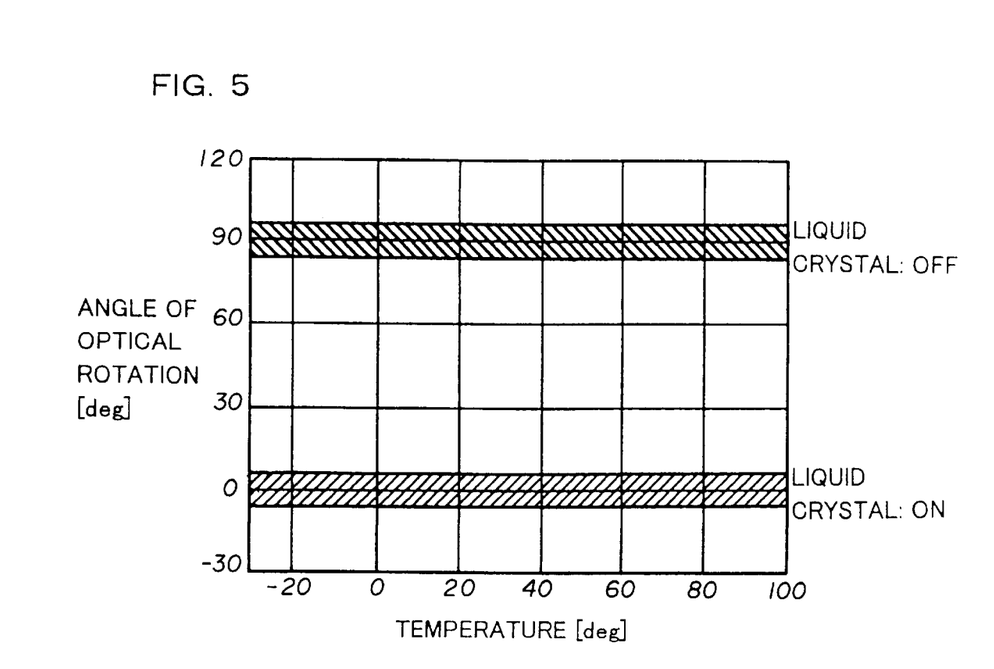
FIG. 5 is a characteristic diagram showing a relation between an angle of optical rotation of a laser beam caused by the optical active element shown in FIG. 4 and operating temperature.

FIG. 5 is a characteristic diagram representing a relation between an angle of optical rotation formed by optical active element 11, i.e. the angle formed between a polarization direction of an introduced laser beam and a polarization direction of an emanating laser beam, and temperature. As shown in FIG. 5, the angle of optical rotation when no voltage is applied, which is approximately 90°, is desirably almost temperature-independent in a range of −20 to 100° C., and the angle of optical rotation when voltage is applied, which is approximately 0°, is desirably almost temperature-independent in a range of −20 to 100° C., since optical pick-up devices generally operate in the range of temperature described above and an optical active element 11 with the temperature characteristic shown in FIG. 5 can thus operate normally. As such, if the range of operating temperature of an optical pick-up device is 20 to 60° C. or 0 to 50° C., the range of temperature in which an angle of optical rotation is temperature-independent may also be the same as the range of operating temperature of the optical pick-up device.

Figure 6A:
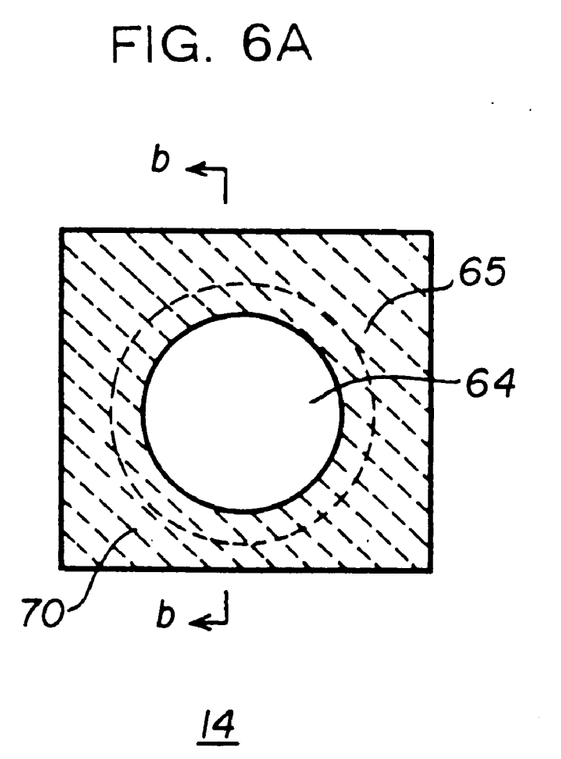
FIG. 6A is a front view of the polarizer shown in FIG. 1
Figure 6B:
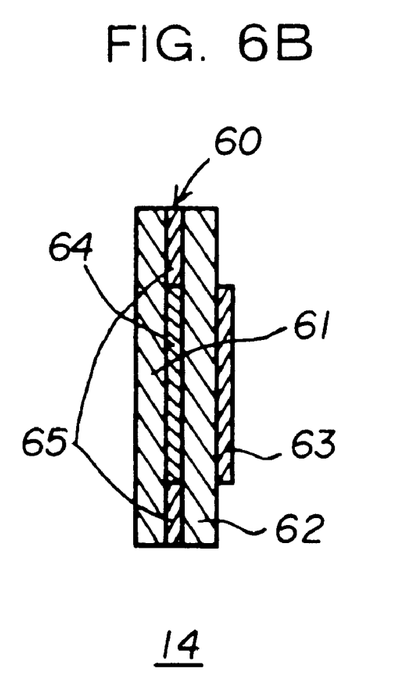
FIG. 6B is a cross section of the FIG. 6A polarizer taken along line b—b in FIG. 6A.
Figure 7:
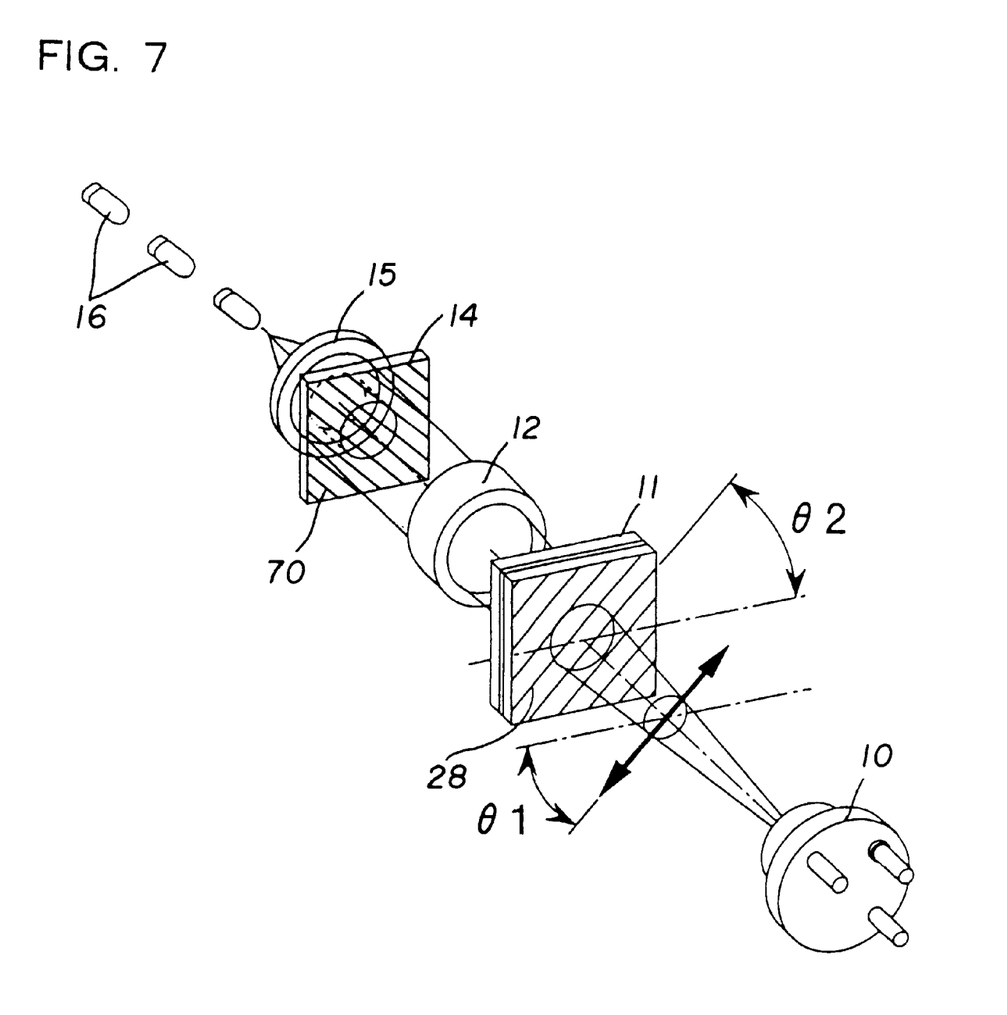
FIG. 7 is a perspective view of the optical system of the optical pick-up device shown in FIG. 1 excluding the mirror.

FIG. 6A is a front view of a structure of polarizer 14 shown in FIG. 1, and FIG. 6B is a cross section of the polarizer 14 taken along line b—b in FIG. 6A. Referring to FIGS. 6A and 6B, polarizer 14 includes a polarizing film 60, two glass plates 61 and 62 which sandwiches polarizing film 60, and a transparent film 63 stuck on a surface of glass plate 62 located closer to objective lens 15. Polarizing film 60 has a transparent, circular central region 64 which does not have polarization characteristic, and a peripheral region 65 which is formed at the periphery of central region 64 and has polarization characteristic. To allow transmission of a laser beam with its polarization direction rotated by optical active element 11, peripheral region 65 has, as shown in FIG. 7, a polarization direction 70 approximately parallel to the rotated polarization direction. In other words, polarization direction 70 of peripheral region 65 is optically approximately parallel to rubbing direction 29 of rubbing film 25, which is positioned at the emissive side of the laser beam, of optical active element 11. As such, the central region provides a transmissitivity of 100%, whereas peripheral region 65 provides a transmissitivity of approximately 70 to 90%. Accordingly, transparent film 63 with a transmissitivity of approximately 70 to 90% is stuck such that it corresponds to central region 64 to provide a generally uniform transmissitivity of polarizer 14.

An operation of the optical pick-up device thus configured will now be described.

Figure 8:
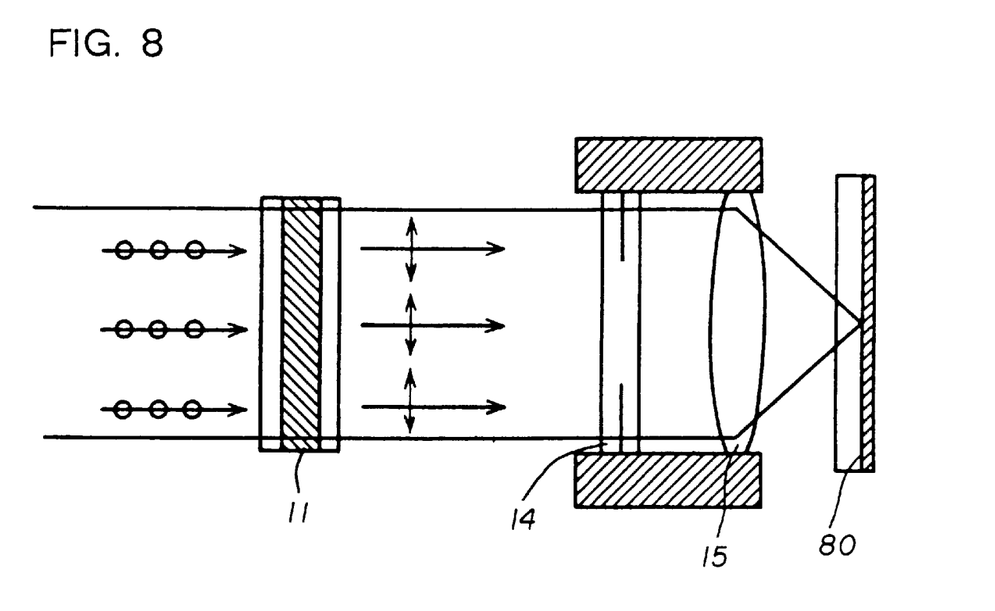
FIG. 8 is a view for illustrating an operation of the optical pick-up device shown in FIG. 1 during playback of a DVD.

During playback of a DVD, switching element 32 in driver circuit 30 shown in FIG. 3 is switched off and no voltage is thus applied between transparent electrodes 22 and 23 of optical active element 11. Thus, optical active element 11 rotates the polarization direction of a laser beam by approximately 90°, as shown in FIG. 8. As a result, the polarization direction of the introduced laser beam is perpendicular to the plane of FIG. 8, whereas the polarization direction of the emanating laser beam is parallel to the plane of FIG. 8.

Central region 64 of polarizer 14, which does not have polarization characteristic, transmits laser beam. Peripheral region 65 of polarizer 14, which has polarization characteristic and has its polarization direction approximately parallel to the polarization direction of a laser beam emanating film optical active element 11, also transmits laser beam. Thus, laser beam is not blocked by polarizer 14 and is entirely transmitted through polarizer 14. Thus, the laser beam incident on objective lens 15 is focused on a signal recording surface 80 of the DVD.

Figure 9:
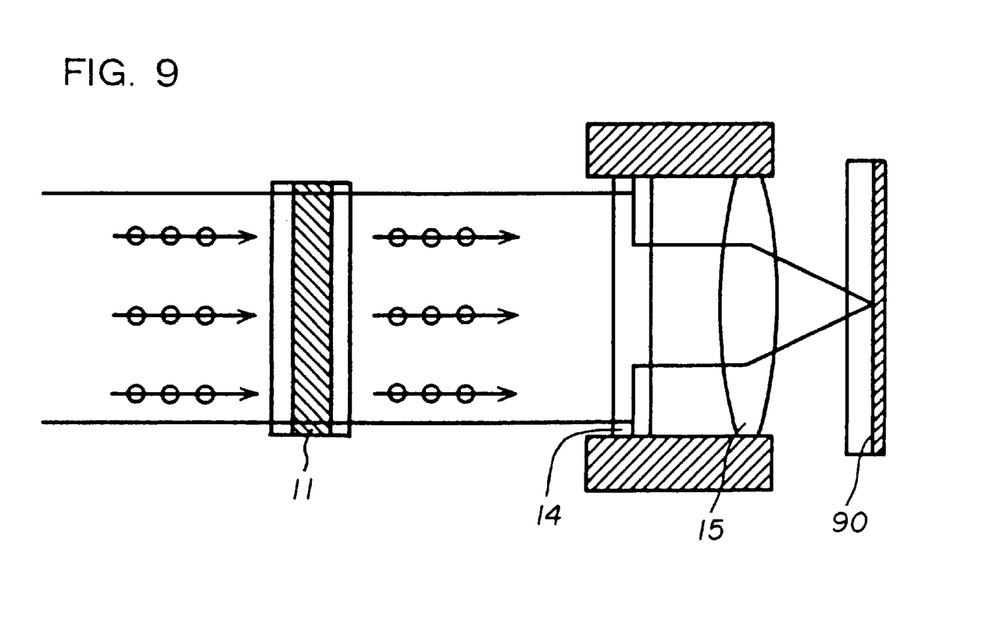
FIG. 9 is a view for illustrating an operation of the optical pick-up device shown in FIG. 1 during playback of a CD.

During playback of a CD, switching element 32 in driver circuit 30 shown in FIG. 3 is switched on and voltage is thus applied between transparent electrodes 22 and 23 of optical active element 11. Thus, optical active element 11 does not rotate the polarization direction of an introduced laser beam and thus transmits the introduced laser beam as it is, as shown in FIG. 9. As a result, the polarization direction of a laser beam emanating from optical active element 11 is parallel to that of an introduced laser beam.

Since central region 64 of polarizer 14 does not have polarization characteristic, central region 64 transmits laser beam. However, peripheral region 65 of polarizer 14, having a polarization direction perpendicular to the polarization direction of the laser beam, blocks the perimeter of the laser beam. Thus, polarizer 14 transmits only the center of the laser beam. Thus, the effective numerical aperture of objective lens 15 is reduced and the laser beam incident on objective lens 15 is focused on a signal recording surface 90 of the CD.

Since rubbing film 24 of optical active element 11 that is located at the incident side of a laser beam is parallel to polarization direction 17 of the introduced laser beam 18, the laser beam transmitted through optical active element 11 will not have its intensity decreased significantly. For example, if $|\theta 1-\theta 2|=45°$, the intensity of a laser beam might be disadvantageously reduced significantly by optical active element 11. Accordingly, rubbing film 24 is rubbed in a direction approximately parallel to polarization direction 17 of the introduced laser beam 18.

Thus, the optical pick-up device according to the present embodiment can provide an effective numerical aperture of objective lens 15 smaller during playback of a CD than during playback of a DVD to play back DVD as well as CD. Furthermore, rubbing direction 28 of rubbing film 24 of optical active element 11 that is located at the incident side of a laser beam can be approximately parallel to polarization direction 17 of the introduced laser beam 18 to reduce laser beam loss caused by optical active element 11 and thus improve the reproduction characteristic of the device.

Although one embodiment of the present invention has been described specifically, the scope of the present invention is not limited to this embodiment.

For example, $|\theta 1-\theta 2|$ may be equal to $90\pm5°$. In other words, rubbing film 24 of optical active element 11 that is positioned at the incident side of a laser beam, may have a rubbing direction approximately perpendicular to polarization direction 17 of the introduced laser beam 18. In this example, rubbing film 25 positioned at the emissive side of the laser beam will have a rubbing direction approximately parallel to polarization direction 17 of the introduced laser beam 18.

According to the above embodiment, the polarization characteristic of polarizer 14 is patterned. However, the entire region of a polarizer may have polarization characteristic and a transparent electrode of an optical active element may be patterned. In this example, if the peripheral region of the transparent electrode only receives voltage during playback of a CD to transmit only the center of a laser beam with its polarization direction rotated, the circumference of the laser beam incident on the polarizer will be blocked and only the center of the laser beam will be transmitted through the polarizer.

According to the above embodiment, voltage is applied in playback of CD. However, voltage may be applied in playback of DVD. In this example, the polarizer need only have a polarization direction parallel to the polarization direction of an introduced laser beam.

While the above embodiment has only described the playback operation of the device, the recording operation thereof is almost the same as the playback operation thereof. Therefore the present invention is applicable not only to optical pick-up devices dedicated to playback but to optical pick-up devices dedicated to recording or optical pick-up devices for both recording and playback.

The present invention is also applicable to optical disks, such as compact disk-recordable (CD-R) and magneto-optic (MO) disk, and can thus be implemented with various improvements, modifications, variations and the like based on the knowledge of those skilled in the art without departing from the scope of the present invention.

What is claimed is:

1. An optical pick-up device recording on and/or playing back a first optical disk having a transparent substrate of a first thickness and a second optical disk having a transparent substrate of a second thickness, said second thickness being greater than said first thickness, comprising:

a laser (10) producing a laser beam (18) having a predetermined polarization direction (17);

a rotation element (11) for rotating a polarization direction (17) of said laser beam (18) by approximately 90° in recording on or playback of said first or second optical disk;

an objective lens (15) for focusing said laser beam (18) on a signal recording surface (80, 90) of said first or second optical disk; and a polarizer (14) blocking a perimeter of said laser beam (18) in recording on or playback of said second optical disk; wherein said rotation element (11) includes a first transparent electrode (22) located at an incident side of said laser beam (18), a second transparent electrode (23) located at an emissive side of said laser beam (18), and opposite to said first transparent electrode (22), a first rubbing film (24) formed on an inner surface of said first transparent electrode (22) and having a first rubbing direction (28) substantially parallel or perpendicular to a polarization direction of said laser beam (18), a second rubbing film (25) formed on an inner surface of said second transparent electrode (23) and having a second rubbing direction (29) substantially perpendicular to said first rubbing direction (28), and liquid crystal (26) interposed between said first rubbing film (24) and said second rubbing film (25).

2. The optical pick-up device according to claim 1, further comprising an applying circuit (30) for applying a voltage between said first transparent electrode (22) and said second transparent electrode (23) in recording on or playback of said first or second optical disk.

3. The optical pick-up device according to claim 1, wherein said polarizer (14) includes:

a central region (64) not having a polarization characteristic; and a peripheral region (65) formed at a periphery of said central region (64) and having a polarization characteristic.

4. The optical pick-up device according to claim 3, wherein said polarizer (14) further includes a member (63) formed on said central region (64) and having a transmissitivity lower than a transmissitivity of said central region (64).

5. The optical pick-up device according to claim 1, wherein a polarization direction (70) of said peripheral region (65) is substantially parallel to said second rubbing direction (29).

6. The optical pick-up device according to claim 1, wherein:

said first optical disk is a digital video disk; and said second optical disk is a compact disk.

7. An optical pick-up device recording on and/or playing back a digital video disk and a compact disk, comprising:

(a) a laser (10) producing a laser beam (18) having a predetermined polarization direction (17);

(b) an optical active element including a first transparent electrode (22) located at an incident side of said laser beam (18), a second transparent electrode (23) located at an emissive side of said laser beam (18), and opposite to said first transparent electrode (22), a first rubbing film (24) formed on an inner surface of said first transparent electrode (22) and having a first rubbing direction (28) substantially parallel to a polarization direction of said laser beam (18), a second rubbing film (25) formed on an inner surface of said second transparent electrode (23) and having a second rubbing direction (29) substantially perpendicular to said first rubbing direction (28), and liquid crystal (26) interposed between said first rubbing film (24) and said second rubbing film (25);

(c) an objective lens (15) opposite to a signal recording surface (80, 90) of said digital video disk or said compact disk;

(d) a polarizer (14) including a central region (64) not having a polarization characteristic, and a peripheral region (65) formed at a periphery of said central region (64) and having a polarization characteristic in a polarization direction (70) substantially parallel to said second rubbing direction (29); and (e) a driver circuit (30) disposed to prevent application of voltage between said first transparent electrode (22) and said second transparent electrode (23) in recording on or playback of said digital video disk and to allow application of voltage between said first transparent electrode (22) and said second transparent electrode (23) in recording on or playback of said compact disk.

* * * * *